UNITED STATES PATENT OFFICE.

HENRY DEACON, OF APPLETON HOUSE, NEAR WARRINGTON, ENGLAND.

IMPROVEMENT IN MANUFACTURE OF SULPHATES OF POTASH, SODA, &c.

Specification forming part of Letters Patent No. 123,875, dated February 20, 1872.

SPECIFICATION.

I, HENRY DEACON, of Appleton House, near Warrington, in the county of Lancaster, England, have invented an "Improved Process of Manufacturing Sulphate of Soda, Sulphate of Potash, and Chlorine," of which the following is a specification:

This invention consists in causing heated sulphurous or sulphuric acids, mixed with air or oxygen, and with or without vapor of water, to pass in succeeding alternations over, or through, or in contact with certain chemical substances herein described, and called catalytic, and over, through, or in contact with the alkaline chlorides, common salt, or chloride of potassium, which alkaline chlorides are kept separate from the said catalytic substances, or may be easily separated therefrom by mechanical means.

To avoid repetition in this specification I shall use symbols for the various bodies, as shown in the following list:

I shall use S to imply sulphur; O, to imply oxygen; Cl, to imply chlorine; HO, to imply vapor of water; $SO_2$, to imply sulphurous acid; $SO_3$, to imply anhydrous sulphuric acid; $SO_4H$, to imply hydrated sulphuric acid; NaCl, to imply common salt; $NaSO_4$, to imply sulphate of soda; KCl, to imply chloride of potassium; $KSO_4$, to imply sulphate of potash; but Na or K may be substituted one for the other throughout the whole of any series of reactions.

By the phrase "catalytic substance," when used herein, I mean a substance which, without undergoing material change itself, forms, or assists to form, either $SO_3$ from a heated mixture of $SO_2+O$, or Cl from a heated mixture of $HCl+O$, when such heated mixtures of gases and the heated substance are brought into contact. Sulphate of copper is such a substance, and will usually be found a very convenient substance to use. But some substances are more active to form $SO_3$ than Cl—for example, burned clay, peroxide of iron, &c., which, at a suitable temperature, will form, or assist to form, large quantities of $SO_3$ from a heated mixture of $SO_2+O$, and only small quantities of Cl from a heated mixture of $HCl+O$; but while all such substances are herein called "catalytic substances," it is left to the manufacturer to select that which is most suitable and convenient for his purpose. The catalytic substance may be used to impregnate porous materials, such as pieces of burned clay, by immersing them into its solution, and these impregnated materials may be used instead of the pure substance itself.

I will now describe the chemical reactions, which vary according to the presence or absence of vapor of water. Thus, heated $SO_2+O+HO$, brought into contact with heated NaCl, react and ultimately furnish $NaSO_4+HCl$. If this HCl be mixed with O, and be passed over a catalytic substance, $HCl+O$ become $HO+Cl$. This series of reactions would be thus expressed:

First operation—reaction of gases on alkaline chloride: $SO_2+2O+HO+NaCl=NaSO_4+O+HCl$. Second (alternate) operation—reaction of catalytic substances on gases: $O+HCl=Cl+HO$.

But heated $SO_2+O$ (without HO) have no action on heated NaCl unless $SO_2+O$ are combined as $SO_3$; then $2SO_3+NaCl=NaSO_4+SO_2+Cl$. The catalytic substance in this case must be able to form, or assist the formation, of $SO_3$. This series of reactions would be thus expressed: First operation—reaction of gases on catalytic substance: $4SO_2+8O=4SO+4O$. Second (alternate) operation—reaction of gases on alkaline chloride: $4SO_3+4O+2NaCl=2NaSO_4+2SO_2+4O+2Cl$. Third (alternate) operation—same as first operation: $2SO_2+4O+2Cl=2SO_3+2O+2Cl$. Fourth (alternate) operation—same as second operation: $2SO_3+2O+2Cl+NaCl=NaSO_4+SO_2+2O+3Cl$; and so on, by successive alternate operations, until no material quantity of $SO_2$ is left; and the whole reaction may be thus expressed as to its results: $4SO_2+8O+4NaCl=4NaSO_4+4Cl$.

For convenience, I have assumed that the whole of the $SO_2+O$ can at once be converted into $SO_3$. This is, however, not the case; some $SO_2$ is always left, but by removing the $SO_3$ as it is formed, ultimately the whole of the $SO_2+O$ may be obtained as $SO_3$. Where HO is employed it remains in the escaping gases, and a smaller quantity of vapor of water than is a chemical equivalent to the sulphurous acid first employed will suffice in an alternate and repeated set of reactions. Thus, if two equivalents of $SO_2$ be used to one of HO, or if $2SO_2+4O+HO$ be passed over heated NaCl, the reactions would be thus expressed: First operation—reaction of gases on alkaline chloride: $2SO_2+4O+HO+NaCl=NaSO_4+SO_2+3O+HCl$. Second and alternate operation—reaction of catalytic substance on gases:

$SO_2+3O+HCl = SO_2+2O+HO+Cl$. Third and alternate operation—repetition of the first operation: $SO_2+2O+HO+Cl+NaCl = NaSO_4+O+HCl+Cl$. Fourth and alternate operation—repetition of second operation: $O+HCl+Cl = 2Cl+HO$. The ultimate result may be thus expressed: $2SO_2+4O+HO+2NaCl = 2NaSO_4+2Cl+HO$; or, taking another proportion: $3SO_2+6O+HO+3NaCl = 3NaSO_4+3Cl+HO$, or similarly for any other proportion of $SO_2$ and $HO$.

For the sake of simplicity in the formula, the last of the foregoing series is commenced with the reaction of the gases on the alkaline chlorides; but the same ultimate result would ensue if the heated gases were first brought into contact with the catalytic substance; but the presence of $HO$, and the reaction of $SO_2+O+HO$ on $NaCl$, leads to a complicated series of intermediate reactions, all having the same material ultimate result. But it must always be borne in mind that where there is no $HO$ the resulting gases will contain no $HCl$, and where $HO$ is present some $HCl$ will be present, but not necessarily in any material quantity. When $HO$ is present it is necessary, in order to obtain the largest possible amount of $Cl$, that the gases should come into contact with the catalytic substance as the last of the alternate operations. Where $HO+HCl+SO_2+O$ are mixed together and passed over a catalytic substance which reacts both on $HCl+O$ and on $SO_2+O$, the reaction on $HCl+O$ occurs first, and until that reaction is completed no more $SO_3$ or $SO_4H$ is obtained than is equivalent to the $Cl$ that, *ceteris paribus*, is obtained from $HCl+O$.

Although there are many "catalytic substances," there are many other substances which do not possess the catalytic property in any material or useful degree at any ordinary temperature. Among these may be named the chlorides and sulphates of sodium and potassium and the mineral substance apatite. If, therefore, perfectly dry and heated $SO_2$ and air or $O$ be passed over or through heated and dry $NaCl$, and be not, either previously, alternately, or cotemporaneously, brought into contact with any other substance possessing this power of forming $SO_3$, then no material amount of $NaSO_4$ will be formed, and no material amount of $Cl$ will be liberated. If, however, the $NaCl$ be contained in a vessel or apparatus made of burned clay (bricks) or of iron, (the surface of which is covered with oxide of iron,) then the gases coming into contact with the sides of the vessel or apparatus will be more or less converted into $SO_3$, and this substance will react on the $NaCl$, forming $NaSO_4$ and liberating $Cl$ and $SO_2$. Similarly, if the apparatus or vessel be constructed of or impregnated with a catalytic substance producing $Cl$ from $HCl+O$, then $SO_2+2O+HO+NaCl$, reacting on each other therein, will give $NaSO_4+Cl+HO$. I use burning sulphur or pyrites as a source of $SO_2$, and the general form of apparatus I prefer is a series of vessels or apparatus, or a series of divisions in one or more pieces of apparatus, the whole provided with means of imparting and regulating heat, and which alternately contain, one the catalytic substance, and the next one of the alkaline chlorides throughout the entire series, the alkaline chlorides and their resulting sulphates being thus kept separate from the catalytic substances, or may easily be separated therefrom by mechanical means. The apparatus or divisions containing the alkaline chlorides are provided with means of filling with the alkaline chlorides and of removing the produced alkaline sulphates therefrom, and are worked either continuously or intermittingly, or as a circulating series, whereof each member is in turn the first, and each successive member until the series recommences. Thus, with a series, ABCD—X, the changes would be: BCD—XA; CD—XAB; D—XABC, and so on until the whole series is gone through, when ABCD—X recommences. I prefer to heat the gases and air before entering the apparatus, and I prefer to move the gases throughout the whole series by mechanical aspiration; but propulsion may be used instead of aspiration, or the two may be used together. The resulting gases are to be cooled and purified, and the chlorine utilized in any well-known manner.

I do not claim either the process of manufacturing sulphate of soda or sulphate of potash by passing $SO_2+O+HO$ over, through, or in contact with $NaCl$ or $KCl$; and I do not claim either the process of manufacturing sulphate of soda, or sulphate of potash, or chlorine, when iron or cupreous pyrites, either raw or burned, or other similar substances, are so mixed with common salt or with chloride of potassium that the said chlorides and their resultant sulphates can only be separated from the other solid materials either by solution in water or other chemical agency.

What I do claim is—

The process of manufacturing sulphate of soda and sulphate of potash and chlorine by causing heated sulphurous or sulphuric acids, mixed with air or oxygen, and with or without vapor of water, to pass in succeeding alternations over, through, or in contact with certain chemical substances herein described, and called catalytic, and over, through, or in contact with the alkaline chlorides, common salt, or chloride of potassium, which alkaline chlorides are kept separate from the said catalytic substances, or may be easily separated therefrom by mechanical means.

In witness whereof I have signed my name to this specification in the presence of two subscribing witnesses.

HENRY DEACON.

Witnesses:
JOHN DARNELL,
 *Fenwick Court, Liverpool, Book-keeper.*
JOHN PEARSON,
 *23 Hutchinson street, Liverpool, Clerk.*